Nov. 28, 1967 W. A. HARDY 3,355,674
OPTICAL FIBER LASER DEVICE
Filed June 27, 1962 3 Sheets-Sheet 1
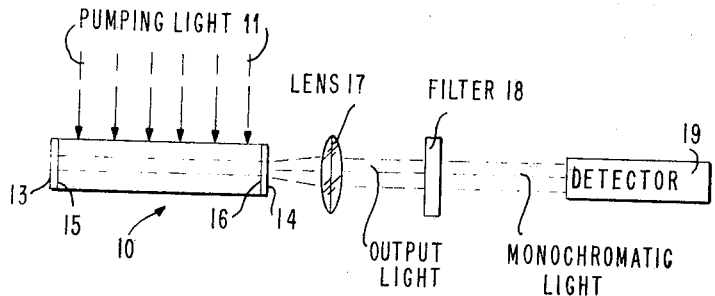
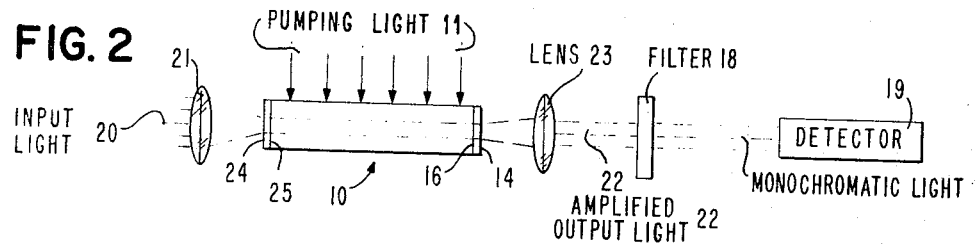
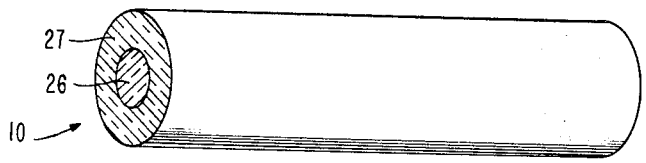
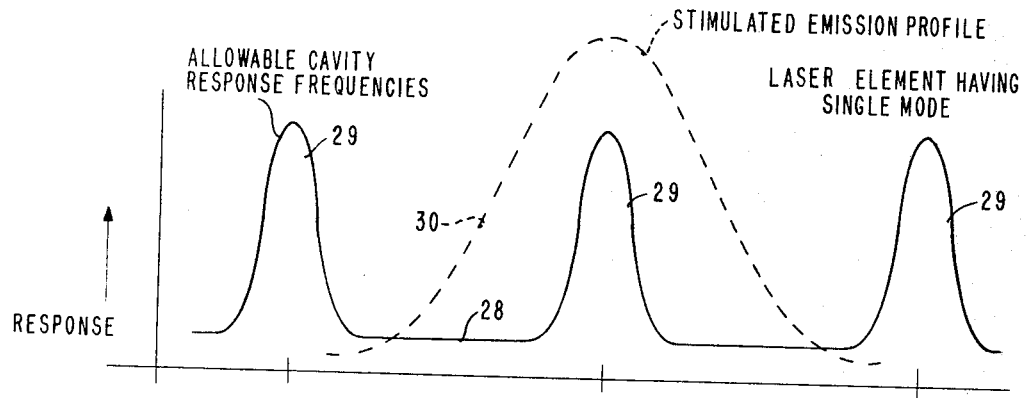
INVENTOR.
WILTON A. HARDY
BY Paul D. Carmichael
ATTORNEY Nov. 28, 1967  W. A. HARDY  3,355,674
OPTICAL FIBER LASER DEVICE
Filed June 27, 1962  3 Sheets-Sheet 2

Nov. 28, 1967  W. A. HARDY  3,355,674
OPTICAL FIBER LASER DEVICE
Filed June 27, 1962  3 Sheets-Sheet 3

United States Patent Office 3,355,674
Patented Nov. 28, 1967

3,355,674
OPTICAL FIBER LASER DEVICE
Wilton A. Hardy, Ossining, N.Y., assignor to International Business Machines Corporation, New York, N.Y., a corporation of New York
Filed June 27, 1962, Ser. No. 205,639
2 Claims. (Cl. 331—94.5)

The present invention relates generally to improvements in apparatus for producing coherent light by stimulated emission. Apparatus of this type is commonly referred to as an optical maser or laser, the latter term being an acronym for light amplification by stimulated emission of radiation.

Much attention and research effort has recently been directed to the field of lasers since the availability of a source of coherent light has produced new horizons in many fields of science. Several types of lasers have been successfully operated—including a gaseous discharge type and several solid state types. In general, a solid state type of laser usually has as its active element a crystal containing a suitable doping material. The crystal is contained and mounted in a physical structure or cavity and exciting or pumping power is supplied from an external radiating source. The pumping power raises certain of the atoms or ions in the crystal to an excitation state. The atoms or ions in the excitation state then undergo a transition which ultimately results in a spontaneous radiation to provide an output signal of high intensity and low frequency spread. The transition may involve one or more intermediate atomic or molecular states having a comparatively long life time. For more information concerning the operation of such a laser, reference may be made to a paper entitled, "Lasers and Their Applications," by I. J. D'Haenens and D. A. Buddenhagen which appears in the April-May 1962, Newsletter of the Society of Photographic Instrumentation Engineers. For use in a wide variety of applications, a laser should provide an intense source of light energy that is monochromatic in frequency, possesses extremely highly directionality and is controllable in frequency over a desired band width.

Available solid state lasers, and particularly those employing large crystals, are incapable of fully satisfying all of the above requirements at the present time. The frequency and intensity of the output signal from a solid state type laser are strongly dependent upon the coupling of the atomic emission to the properties of the cavity. The small wavelength of the optical radiation for physically realizable cavities means the number of allowable modes in a given frequency interval into which the spontaneous emission can radiate is extremely large. The existence of a large number of allowable modes provides an output signal which is not monochromatic but rather contains a mixture of frequencies corresponding to the allowed modes. The frequency distribution of the output signal is further broadened by imperfections in the crystal which defines regions of slightly different mode quality or "filaments" throughout the crystal. This also inhibits the directionality of the output signal since there is a lack of phase coherence at the output surface of the crystal.

The operating time of a solid state laser is dependent upon the ability to dissipate heat from the excited crystal. The heat in the crystal is lattice heat energy and represents the difference between the energy entering the system from the pumping source and the energy of the output signal. In a continuously operating solid state laser, the heat should be dissipated or transferred away from the crystal at the same rate at which the same is generated. The inability to accomplish this heat transfer, even with the use of very extensive cooling means, has meant that solid state lasers can usually be operated only periodically on a relatively low duty cycle if the heat energy in the crystal is to be maintained within allowable limits. The heat energy stored within the crystal changes the properties of the individual "filaments" and distorts the crystal. This is another cause of the spread of the frequencis in the output signal.

Another difficulty experienced with solid state lasers having crystals of certain materials is that instabilities are connected with pumping the atoms or ions to the threshold or excitation state for stimulated emission and the rapid depopulation of the excited states when the stimulated emission occurs. This causes transient variations of an erratic nature in the output signal. Such variations apparently depend upon the modes and the amplitude of the exciting radiation.

All of the above have effectively limited solid state lasers to laboratory devices whose applications, although widely recognized, have been extremely limited. For example, present solid state lasers have no unique threshold for the oscillation condition due to the presence of different "filaments" and the jumping of modes. This means that such devices could not readily be used as low signal amplifiers, although, in principle, the same are ideally suited for this application.

In a paper entitled "Proposed Fiber Cavities for Optical Masers" by E. Snitzer which appears in the January 1961, issue of the Journal of Applied Physics, pages 36–39, the use of dielectric waveguides in the form of small fibers in lasers is considered. The laser element consists of a fiber core of laser material which is surrounded by a cladding having a lower index of refraction. The work of Snitzer indicates that for a fiber whose diameter approaches a wavelength of light, the propagation of light along the axis of the fiber is determined by the properties of dielectric waveguide modes similar to those encountered in microwave theory for much longer wavelengths. If the diameter of the fiber is sufficiently small, only one mode of allowable.

Briefly, the present invention relates to the provision of an improved fiber laser wherein the laser element is an optical fiber surrounded by a cladding material. Means are provided for cooling the laser material during the operation thereof and for effecting the efficient transfer of energy from the pumping source to the laser element. The cooling means comprises a heat sink which is disposed closely and in highly efficient heat transfer relation with respect to the fiber core of laser material. The cladding material has a relatively small thickness adjacent the heat sink and is in intimate contact therewith so that heat is dissipated very quickly from the fiber core of laser material. The transferring means comprises an optical system and the cladding material may form a portion of this system. The cladding material has a relatively small thickness adjacent the heat sink and a relatively large thickness in the direction of the incoming energizing radiation to form a lens for focusing an image of the energizing source on the fiber core of laser material. The optical system employs cylindrical reflecting surfaces or cylindrical lens for imaging the source of pumping or energizing radiation on the fiber core of laser material.

It is the primary or ultimate object of the invention to provide an improved laser having as the laser element a fiber core of laser material which is coated with a cladding material. The laser element is preferably fabricated so that only one mode is allowable and the fiber core of laser material does not have "filaments" or regions of slightly different mode quality. This effectively mitigates and eliminates many of the problems encountered with prior art solid state lasers and allows the provision of a laser whose output signal is truly monochromatic and highly directional.

Another object of the invention is to provide a laser of the type above described which has improved means for cooling the same. A heat sink is so disposed with respect to the laser element that maximum heat transfer is accomplished. The heat energy generated in the fiber core of laser material can be removed at such a rate that stimulated emission or laser operation in a continuous manner becomes possible. Also, proper cooling reduces distortion of the crystal due to temperature changes so that the output signal is not adversely affected thereby.

Yet another object of the invention is the provision of an optical fiber laser having improved means for energizing or pumping the same. This means comprises optical systems capable of focusing the image of a radiating source on the fiber core of laser material. The optical system may comprise the cladding material which is formed to act as a lens and reflecting surfaces adjacent the heat sink.

A further object of the invention is to provide an optical fiber laser having the characteristics described above which is highly simplified in construction and operation. The laser is adapted for use in applications where present lasers cannot now be employed.

The foregoing and other objects, features and advantages of the invention will be apparent from the following more particular description of a preferred embodiment of the invention, as illustrated in the accompanying drawings.

In the drawings:

FIGURE 1 is a schematic diagram of an optical fiber laser which is used as a generator for producing light output signals;

FIGURE 2 is a schematic diagram of an optical fiber laser used as a light amplifier;

FIGURE 3 is an end perspective view of a laser element comprising a fiber core of laser material surrounded by cladding material;

FIGURE 4 is a graphical presentation showing the allowable cavity frequency response of a laser element operating in a single mode and the stimulated emission profile of the doped ions in the fiber core of laser material;

Figure 5:
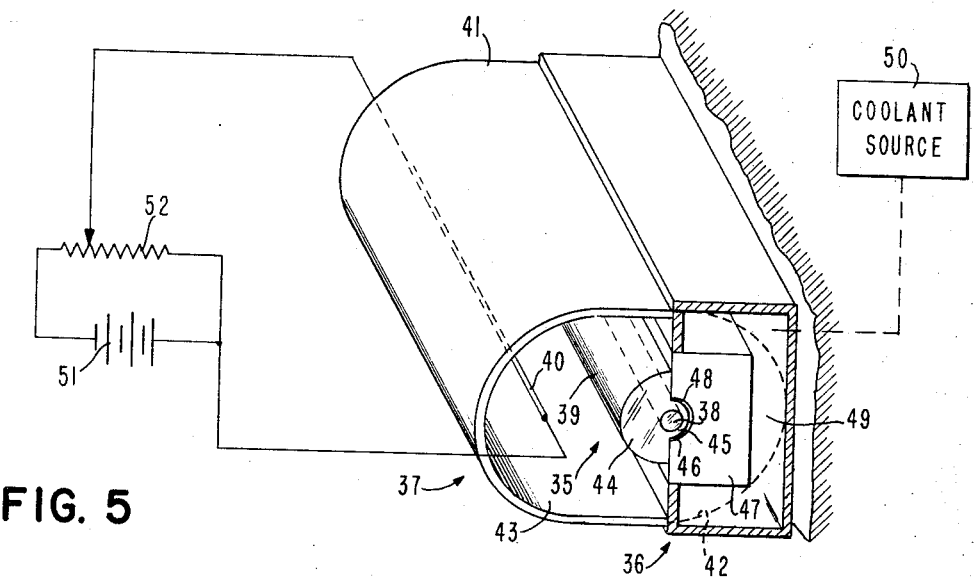
FIGURE 5 is a schematic view showing the mounting of a laser element—including the means for cooling and the means for transferring pumping energy to the laser element—in accordance with the teachings of this invention.

Referring now to the drawings, and initially to FIGURE 1 thereof, there is shown in schematic fashion an optical fiber laser which is used as a generator of electromagnetic waves or radiation. The radiation produced by the optical fiber laser is highly directional and coherent. The generator comprises a laser element 10 having a fiber core of laser material surrounded by a cladding material. The construction of the laser element 10, along with the cooling and pumping means therefor, will be more fully described in the following portions of the specification.

Pumping light or luminous energy 11 is applied to the laser element 10 and is of sufficient intensity and proper frequency to produce stimulated emission in the laser element. Reflecting means 13 and 14 are disposed at each end of the laser element to provide reflecting surfaces 15 and 16, respectively. The reflecting surfaces 15 and 16 intercept luminous energy emanating from within the laser element 10 so as to form a structure or cavity within which oscillations are built up. The reflecting means 13 and 14 can be formed of multiple dielectric layers of silver film, for example. The reflecting means 13 is completely reflective and opaque while the reflecting means 14 allows a small portion of the incident light intercepting the same to be transmitted outwardly from the laser element to a lens 17 and filter 18. The filter 18 may be a conventional interference filter or monochromator for filtering all light except that of the desired frequency to provide highly directional, coherent and monochromatic light. The presence of the highly directional, coherent and monochromatic output light is sensed by a detector 19 which may comprise a conventional phototube or photomultiplier, for example.

The device shown in FIGURE 2 of the drawings is similar in construction to that depicted in FIGURE 1 but serves as an amplifier. Input light 20 is introduced at one end of the laser element 10 by condensing lens 21 and amplified output light 22 is taken from the opposite end thereof via lens 23. For this type of operation, it is necessary that the reflecting means 24 defining reflecting surface 25 permit at least a portion of the input light incident thereon to be transmitted therethrough. When operated in this manner, the pumping light 11 has an intensity below the threshold level of the fiber core of laser material whereby the pumping light alone is not of sufficient intensity to produce oscillations in the laser element. In the absence of the input light 20, only a low intensity output light due primarily to spontaneous emission is available from the laser element. However, when added energy is applied to the laser element by the input light 20, oscillations are produced within the laser element to begin the process of stimulated emission. The highly directional, coherent and monochromatic light passing from filter 18 is an amplified light signal corresponding to the input light 20 and is intercepted by the detector 19.

In FIGURE 3 of the drawings, the laser element 10 is shown to comprise a fiber core 26 of laser material surrounded by a layer of cladding material 27. The fiber core 26 is cylindrical in shape, but the same may have a transverse cross section in the form of a polygon. The core 26 may comprise a fiber of calcium fluoride doped with samarium ions for radiation in the visible portion of the spectrum or calcium fluoride doped with uranium ions for radiation in the infrared portion of the spectrum. However, the term "laser material" as used herein is not intended to limit the invention to any particular material. Rather, the teachings of the invention are applicable to a laser system utilizing any solid state material capable of producing radiation by stimulated emission.

The core 26 of laser material is a single fiber of such size and length that only one or a very small number of modes will be propagated when stimulated emission occurs. It has been determined that when the laser material is calcium fluoride doped with samarium ions, the fiber core 26 should have a diameter of approximately 1.5 microns for the propagation of only one mode. Alternately, when calcium fluoride doped with uranium ions is used, the fiber core should have a maximum diameter of approximately 5 microns for single mode propagation.

The fiber core 26 can be formed by taking a large crystal of laser material and cutting the same into small elongated pieces with a diamond saw. The individual pieces are then ground and polished to the final dimension. Alternately, for certain laser materials, an elongated piece of the material may be heated to its plastic state and worked by drawing until a fiber of the desired size has been obtained.

The cladding material 27 surrounds and has a lower index of refraction than the fiber core 26. The layer of cladding material may be formed by dipping the fiber core 26 in a solution of Teflon or encasing the fiber core in glass in accordance with well known encapsulation techniques. The cladding material is then ground and polished so that the resultant laser element is of the desired physical size. The cladding material 27 is shown to be cylindrical and concentric with the fiber core 26 in FIGURE 3 of the drawings, but, as will be hereinafter more fully explained, the thickness of the cladding may vary about the transverse periphery of the fiber core. Although glass and Teflon have been suggested as cladding materials, other material can be employed. The primary criteria in the selection of the cladding material are the ratio of the indices of refraction of the fiber core and the cladding material and the additional functions to be performed by the cladding material in transferring pumping energy to and dissipating heat energy from the fiber core 26 of laser material.

In FIGURE 4 of the drawings, there is shown a curve 28 which represents the response with respect to frequency of a laser element limited to a single mode of operation. The curve has several peaks 29 spaced therealong which represent the condition that only an integral number of half wavelengths can form standing waves over the length of the laser element. The width of these peaks is determined by the quality factor of the optical resonant structure or cavity. The frequency of each of these peaks is given by the following equation:

$$f_p = \frac{2_{vl}}{N}$$

where:

$f_p$=frequency of each peak
$v$=propagation velocity of light for a given mode
$l$=length of laser element
$N$=number of half wavelength of light (approximately $10^5$) which may form standing waves along the axis of the fiber.

The curve 30 shows the response with respect to frequency of the stimulated emission of the laser element. It is noted that the stimulated emission profile of the laser element overlies only one of the peaks 29. For this condition, the laser element will operate at a single frequency that is intermediate the peak of the stimulated emission and the closest allowable cavity response frequency. It is a property of this type of feedback system that for low excitation powers, there will be a tendency for oscillation to occur only at the cavity response frequency closest to the stimulated emission profile. The output from the laser element of a size which permits only one mode of operation should therefor be truly monochromatic. This should be true even if the stimulated emission profile is considerably broader and overlies several of the allowable cavity response frequencies.

If the fiber core 26 of laser material is larger so as to permit more than one or different modes of propagation, the laser element will have different cavity response frequencies. The phase velocity of each of these modes is slightly different. Each mode propagating from the end of the fiber core will have a different radiation pattern depending on the diffraction of the wavefronts at the end of the fiber core.

From the above discussion, it is seen that the optimum optical fiber laser has only one allowable mode of propagation. Such an optical fiber laser, when combined with means for cooling and means for energizing or pumping the same, will provide a laser system capable of producing a truly monochromatic and directional output signal. However, the teachings of the present invention are not specifically limited to an optical fiber laser wherein only one mode is allowed to exist but also apply to optical fiber lasers having multiple modes of propagation. For an optical fiber laser of the latter type, the output signal may be made more monochromatic by employing masks or filters and by proper selection of the thickness of the cladding material to attenuate the light propagating in the undesired modes.

Referring now to FIGURE 5 of the drawings, there is shown a laser system having a laser element 35, cooling means 36 and means 37 for energizing or pumping the laser element. The laser element is similar to the element disclosed in connection with FIGURE 3 of the drawings in that the same has a rod-like fiber core 38 of laser material which is surrounded by a layer of cladding material 39. The cladding material 39 does not have a constant thickness about the circumference of the fiber core but rather its thickness varies for reasons to be hereinafter more fully explained.

Disposed in spaced relation and extending longitudinally with the laser element 35 is an elongated filament 40. This filament is connected with a suitable and adjustable energy source, represented by battery 51 and potentiometer 52, to define a powerful source of illumination whose intensity can be accurately controlled. Surrounding the filament 40 and the laser element is an open sided, elongated and generally cylindrical member 41. The member 41 can be considered as being an ellipse whose one end portion (represented by broken line 42) has been removed to permit mounting of the cooling means 36 and the laser element 35. The inner surface of the member 41 is coated and highly polished to define an elongated and semi-elliptical reflecting surface 43.

The fiber core 38 of the laser element and the filament 40 are positioned at the foci of the cylindrical ellipse defined by member 41 and broken lines 42. These foci of the semi-elliptical reflecting surface 43 are determined such that an image of the filament 40 is focused on the fiber core 38 of the laser element 35 without appreciable loss in intensity.

The cladding material 39 has an enlarged generally semi-cylindrical portion 44 and a smaller semi-cylindrical portion 45 which extend about the fiber core 38 of the laser material. The smaller semi-cylindrical portion 45 defines a projection which is nestingly received in a semi-cylindrical recess 46 of a large block-like heat sink 47. The heat sink comprises a mass of copper or other material having a high thermal conductivity and the surface of the semi-cylindrical recess 46 therein is coated and highly polished to define a reflecting surface 48. The major surfaces of the heat sink are surrounded by a chamber 49 which is in communication via suitable conduits and valving, not shown, to a source of coolant 50, such as liquid helium. In fabricating the laser element, the thickness of the portion 45 of the cladding material is kept to a minimum consistent with the thickness required for proper laser operation whereby the heat sink is disposed in close proximity and highly efficient heat transfer relation with respect to the fiber core 38 of the laser element.

The portion 44 of the cladding material is much larger than portion 45 thereof and is formed as an elongated semi-cylindrical lens so that the incoming light rays generated by the filament are accurately focused on the fiber core 38. If the reflecting surface 43 of member 41 were a perfect reflector, the fiber core 38 and the filament 40 were perfectly located along the foci of the elongated ellipse defined by member 41 and broken lines 42 and the filament could be considered as a point source, the image of the filament would be accurately focused on the surface of the fiber core of laser material and the lens defined by portion 44 of the cladding material would not be required. However, if reflecting surface 43 is not a perfect reflector and/or the optical system is not perfectly aligned, the lens formed by portion 44 compensates for these small imperfections and misalignments so that the image of the filament 40 is sharply focused on the fiber core of laser material. Of course, the cladding material must be as optically nonabsorbent as possible and no gaps or spaces can exist at the interface between the fiber core and the cladding material.

Considering now the operation of the above-disclosed laser system, the chamber 49 is operatively connected with the source of coolant 50 so that the coolant is circulated through the chamber. The filament 40 is then energized and a line image thereof is focused on the fiber core of laser material. Any light passing through the fiber core is reflected from the reflecting surface 48 of the heat sink back onto the fiber core. When the laser is employed as a source of monochromatic coherent light, reflected means similar to the means 13 and 14 disclosed in connection with FIGURE 1 of the drawings are disposed at the opposite ends of the laser element 35. The fiber element is energized to cause stimulated emission whereby a highly directional and monochromatic output signal is produced. The lattice heat energy in the laser element is quickly dissipated by the cooling means so that the laser can be used on a continuous basis or on a high duty cycle. When the laser is used in amplification applications, a source of input light is required and reflecting means similar to reflecting means 14 and 24 (see FIGURE 2) are employed.

Figure 6:
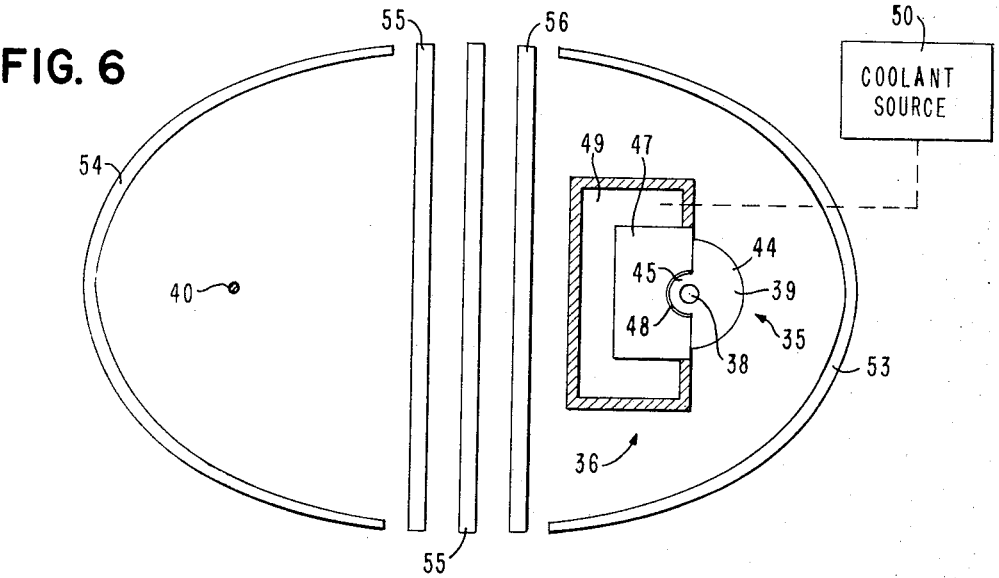
FIGURE 6 is a schematic diagram of an optical fiber laser using cylindrical parabolic reflectors for transferring light energy from the pumping source to the laser element.

The arrangement shown in FIGURE 6 of the drawings is an alternate embodiment wherein the fiber core 38 of the laser element 35 and the filament 40 are disposed at the foci of two inwardly facing and spaced cylindrical parabolic reflectors 53 and 54 which have highly polished interior surfaces. The portion 44 of the cladding material is operative to compensate for any misalignment of the optical system while the cooling means is disposed in closely adjacent and highly efficient heat transfer relation with respect to the fiber core 38 of laser material. This optical system also accomplishes the transfer of the pumping or energizing light to the fiber core with little loss in intensity and has the advantage that filters 55 and a sapphire window 56 can be inserted between the filament 40 and the laser element 35. The filters 55 are operative to remove certain portions of the light emanating from filament 40 whereby the frequency spectrum of the line image focused on the fiber core is limited to a band of frequencies ideally suited for causing stimulated emission in the laser element.

Figure 7:
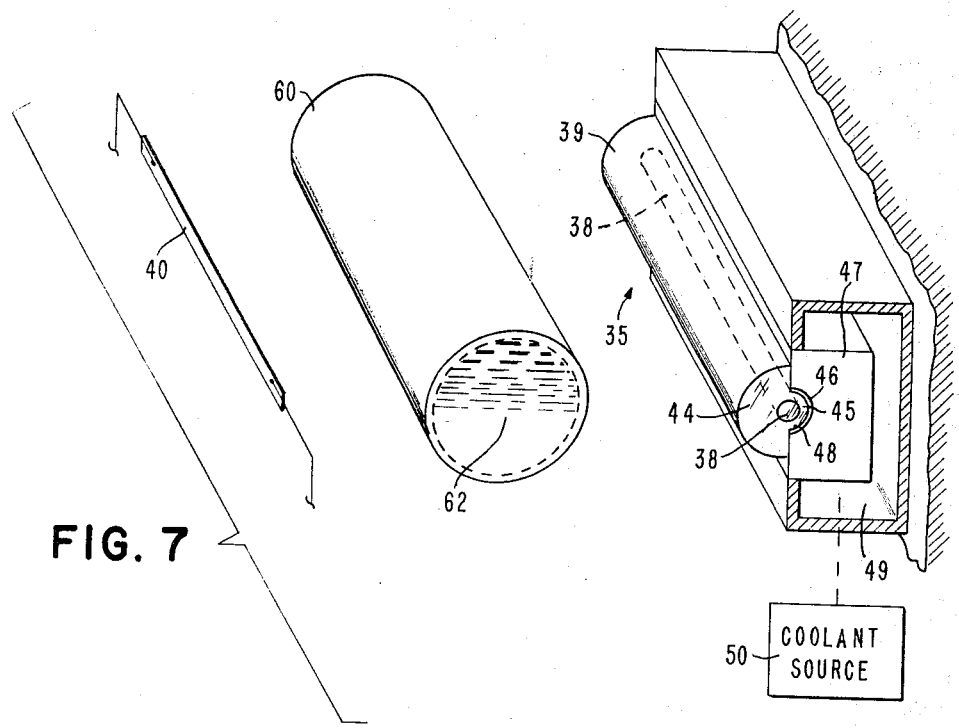
FIGURE 7 is another laser system embodying the teachings of this invention wherein the optical means comprises a cylindrical lens.

The system shown in FIGURE 7 of the drawing is another embodiment of the invention wherein a cylindrical lens 60 is employed as the optical means for focusing an image of the filament 40 on the fiber core 38 of the laser element 35. The filament 40 and the laser element are disposed along the focal point on opposite sides of the cylindrical lens 60. It is recognized that the spherical distortion of the cylindrical lens will limit the intensity of the light which may be concentrated on the filter, but in this instance, the filament can be a flat ribbon rather than a thin rod. The extra radiating surface area of the ribbon-like filament 40 will essentially correct for the spherical aberration in the cylindrical lens. The cylindrical lens 60 is filled with a fluid or fluids 62 which act as filters so that the frequency of the light focused on the fiber core 38 of the laser material is limited to a range which is effective in pumping the laser element. The ability to control the frequency spectrum of the incoming light is advantageous since the main portion of the light energy occurring at frequencies outside the desired frequency range is converted to heat and is not effective in pumping the laser element. Also, this system can be more easily aligned and adjusted although the losses in the optical system are somewhat greater.

Figure 8:
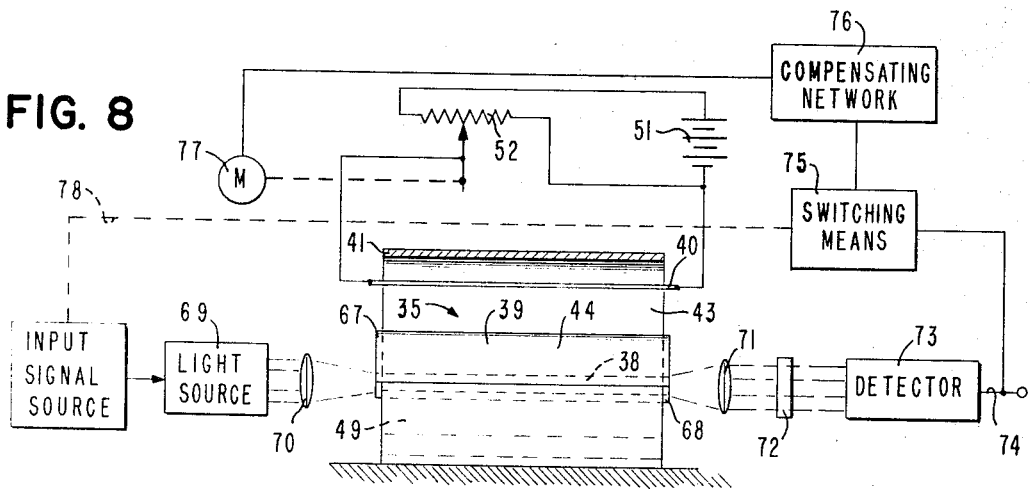
FIGURE 8 is a schematic diagram showing an optical fiber laser system used as a light amplifier with feedback means for stabilizing the operation thereof.

In FIGURE 8 of the drawings, there is shown a laser system similar to that disclosed in FIGURE 3 which is employed as an amplifier and having means to stabilize the output thereof. The ends of the laser element 35 having reflecting means 67 and 68 at the ends thereof and input light from source 69 is introduced into the fiber core 38 of laser material by lens 70. The intensity of light source 69 is controlled by and responsive to the input signals which it is desired to amplify. The light output from the laser element passes through lens 71 and filter 72 to a detector 73 which provides electrical output signals on conductor 74 corresponding to the input signals controlling the intensity of light source 69. For maximum gain in the amplifier system, the pumping light supplied from filament 40 should maintain the laser element at a point just below the threshold for stimulated emission in the absence of input signals to be amplified. At this time, the output light due to spontaneous emission from the laser element should be at approximately the maximum level.

To stabilize the operation of the amplifier, a portion of the output signal on conductor 74 is returned to feedback to control the intensity of the filament 40. The feedback loop comprises a switching means 75, a compensating network 76 and a motor 77 which is adapted to drive the center tap of potentiometer 52. The switching means 75 is responsive to the presence or absence of input signals supplied to the light source 69 as is indicated by the broken line 78. The arrangement is such that the switching means is actuated to open the feedback loop when input signals are supplied to modulate the source 69. At other times, when no input signals are present, the feedback loop is closed and a portion of the output signal from detector 73 is supplied to compensating network 74. The compensating network may comprise an electrical bridge which supplies control signals to motor 77 corresponding to the adjustment required in the intensity of light emanating from filament 40 to maintain the spontaneous emission from the laser element at a constant level in the absence of input signals. In this manner, the output of the laser element is stabilized. It is noted that the signal to noise ratio obtained by such optical amplification is not noticeably improved by this laser process. However, the additional signal photons represented by amplification may be used with conventional optical detectors, such as photomultipliers, to overcome the losses and thus increase the detection efficiency.

As mentioned above, a highly desirable characteristic of a solid state laser is the ability to control the frequency of the output light over a selected bandwidth. An optical fiber laser is believed to be capable of providing such control over the frequency of the output signal. This might be accomplished by having the ion responsible for laser action in a host crystal whereby it is not at the center of symmetry in that crystal. An external electric field applied to the laser element will cause a change in the frequency of the output signal whose magnitude is dependent upon the magnitude of the applied electric field. Alternately, the host crystal may be one for which the optical index of refraction changes as a function of the applied electric field so that frequency control is obtained by tuning the cavity response of the laser element rather than by shifting the ion responsible for laser action in the host crystal. The cladding also may be a material whose optical index of refraction varies in response to an applied electric field. Although this scheme may not be as efficient as those mentioned above, the same should be adequate for frequency control over a limited or small band width. If constant amplitude output light is not required, frequency control might be achieved by controlling the intensity of the exciting light source primarily by changing the temperature of the fiber core of laser material at various pumping levels and relying on the thermal shifts both on the spontaneous emission line and the cavity tuning due to thermal expansion and changes in the dielectric constant. It is also known that mechanical strain applied to the fiber core of laser material will alter its dimensions to tune the cavity response. Further, the application of a magnetic field will shift the included ion in the host crystal where such ion is not at a center of symmetry to produce a change in the frequency of the output signal.

Figure 9:
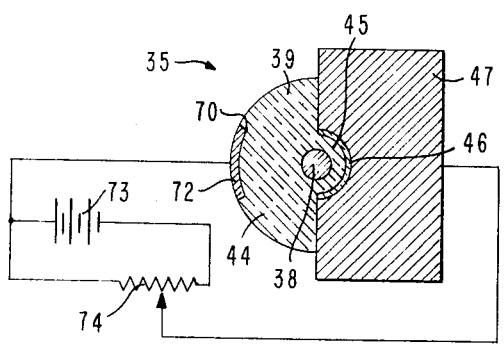
FIGURE 9 is an end view showing means to subject an optical fiber laser element to electric fields to control the frequency of the output signal.

Many of the above schemes for obtaining frequency control over a desired band width involve the application of an electric field to the laser element. An arrangement for this purpose is shown in FIGURE 9 of the drawings wherein the laser element 35 and the heat sink 47 are shown in assembled relation. The outer surface of the portion 44 of the cladding material 39 has a small depression 70 therein which is filled with an optically transparent and electrically conducting material 72 that defines an electrode. Connected across the electrode 72 and the heat sink 47, which is also current conductive, is a suitable and adjustable source of potential as represented by battery 73 and potentiometer 74. The arrangement is such that the heat sink 47 and material 72 define electrodes disposed on opposite sides of and extending with the fiber core 38 of laser material. The potential source establishes an electric field between the electrode 72 and the heat sink 47 and the laser element is subjected to this electric field. Obviously, the potential source may be adjusted in response to any desired input function, such as an analog signal.

It should now be apparent that the objects initially set forth have been accomplished. Of particular importance is the provision of an optical fiber laser capable of propagating in low order mode and having improved means for cooling and energizing the same. Several optical systems for very efficiently transferring pumping energy to the fiber element are disclosed. In addition, a means is shown for subjecting the optical fiber laser to an adjustable electric field.

While the invention has been particularly shown and described with reference to preferred embodiments thereof, it will be understood by those skilled in the art that the foregoing and other changes in form and details may be made therein without departing from the spirit and scope of the present invention.

What is claimed is:

1. A device for producing highly directional, coherent and monochromatic electromagnetic radiation comprising:
   an element having an elongated fiber core of a material susceptible of producing electromagnetic radiation by stimulated emission;
   a layer of cladding material surrounding at least a portion of said elongated fiber core;
   a source of stimulating radiation disposed in spaced relation with respect to said element for stimulating emission in said fiber core;
   means for concentrating the radiation emanating from said source on said fiber core;
   means to subject said fiber core to an electrical field comprising a pair of electrodes disposed on opposite sides of said fiber core;
   one of said electrodes being formed by an electromagnetic radiation transmitting current conductive coating overlying at least a portion of said cladding material; and
   means to apply an adjustable voltage across said electrodes.

2. A device for producing highly directional, coherent and monochromatic electromagnetic radiation comprising:
   an element having an elongated fiber core formed of a material susceptible of producing electromagnetic radiation by stimulated emission;
   a generally cylindrical layer of cladding material surrounding said elongated fiber core and being in generally concentric relation therewith, said layer of cladding material having a first semi-cylindrical portion of relatively large thickness and a second semi-cylindrical portion of a relatively small thickness;
   said second semi-cylindrical portion serving as a heat conduction transfer path from said fiber core, said first and second semi-cylindrical portions having uniform thickness along the length of said fiber core on opposite sides of a plane bisecting the core;
   an elongated source of stimulating radiation disposed in a spaced relation with respect to said element for stimulating emission in said fiber core, the length of said elongated source being substantially equal to the length of said elongated fiber core;
   means for concentrating the radiation emanating from said source on said fiber core whereby to substantially image said elongated source on said fiber core, the first semi-cylindrical portion of said layer of said cladding material being an element of said means for concentrating; and
   an elongated heat sink having a depression along one surface thereof for receiving said second semi-cylindrical portion of said layer,
   said depression being at least coextensive with said second semi-cylindrical portion of said layer,
   said depression having a surface in heat sink relation with said second semi-cylindrical portion of said layer.

References Cited

UNITED STATES PATENTS

| | | | |
|---|---|---|---|
| 2,798,966 | 7/1957 | Summerhayes | 88—57 |
| 2,929,922 | 3/1960 | Schawlow et al. | 331—94.5 |
| 3,087,374 | 4/1963 | Devlin et al. | 88—1 |
| 3,103,587 | 9/1963 | Ure et al. | 250—83 |
| 3,179,898 | 4/1965 | Meltzer | 331—94.5 |
| 3,223,944 | 12/1965 | Luck et al. | 331—94.5 |

OTHER REFERENCES

Bell Lab.: "Continuous Operation Achieved in Solid-State Optical Maser," Bell Lab. Record, volume 40, No. 2, February 1962, pp. 63–64.

Cook: "Output Power and Possible Continuous Operation of Ruby Lasers," Proceedings of the IRE, volume 50, No. 3, March 1962, pp. 330–331.

Nelson et al.: "A Continuously Operating Ruby Optical Maser," Applied Optics, volume 1, No. 2, March 1962, pp. 181–183.

JEWELL H. PEDERSEN, *Primary Examiner.*

R. L. WIBERT, *Assistant Examiner.*